United States Patent [19]

Matsuki et al.

[11] Patent Number: 4,979,695
[45] Date of Patent: Dec. 25, 1990

[54] OVERLOCK PREVENTION MECHANISM FOR ACCELERATION SENSOR

[75] Inventors: Masuo Matsuki, Chigasaki; Sadakazu Furukawa, Fujisawa; Atsushi Sugiura; Toshihito Miyagawa, both of Toyota, all of Japan

[73] Assignee: Nippon Seiko Kabushiki Kaisha, Tokyo, Japan

[21] Appl. No.: 422,909

[22] Filed: Oct. 17, 1989

[30] Foreign Application Priority Data

Oct. 17, 1988 [JP] Japan .................. 63-135342[U]

[51] Int. Cl.$^5$ ............................................. B60R 22/40
[52] U.S. Cl. ............................................. 242/107.4 A
[58] Field of Search ................. 242/107.4 A, 107.4 B; 280/806; 297/478, 480

[56] References Cited

U.S. PATENT DOCUMENTS

| | | | |
|---|---|---|---|
| 4,085,905 | 4/1978 | Lindbald | 242/107.4 A |
| 4,108,394 | 8/1978 | Oishi et al. | 242/107.4 A |
| 4,351,496 | 9/1982 | Fohl | 242/107.4 A |
| 4,485,986 | 12/1984 | Sugimoto | 242/107.4 A |
| 4,607,805 | 8/1986 | Burghardt et al. | 242/107.4 A |

FOREIGN PATENT DOCUMENTS 31-93253  7/1956  Japan .

Primary Examiner—John M. Jillions
Attorney, Agent, or Firm—Hedman, Gibson, Costigan & Hoare

[57] ABSTRACT

An overlock prevention mechanism for a vehicle acceleration sensor used on a retractor for a seat belt device in a vehicle comprises an inertial body which moves in response to acceleration of the vehicle; a sensor casing on which the inertial body is mounted; a ratchet wheel which locks the retractor; and a composite sensor arm assembly comprising an upper sensor arm which is adapted to be engaged with the ratchet wheel and a lower sensor arm which is adapted to come into contact with the inertial body to transmit the movement of the inertial body to the upper sensor arm; and when the upper sensor arm is interlocked with the ratchet wheel, the lower sensor arm is forced toward the inertial body by a force activated from the ratchet wheel and transmitted through the upper sensor arm, so that the inertial body is pressed to the sensor casing against movement.

6 Claims, 2 Drawing Sheets

OVERLOCK PREVENTION MECHANISM FOR ACCELERATION SENSOR

BACKGROUND OF THE INVENTION

1. Field of the Invention

The present invention relates to a seat belt device for an automobile, and, in particular, to an overlock prevention mechanism for a vehicle acceleration sensor on a retractor in the seat belt device.

2. Description of the Prior Art

A seat belt device for an automobile utilizes a webbing to restrain and protect the passenger when an emergency affecting the vehicle such as a collision and the like occurs.

The webbing is wound up on a retractor and stored. When the seat belt is put on, the webbing is pulled out of the retractor and secured by inserting a tongue on the end of the webbing into a buckle.

The webbing is installed on the retractor through a comparatively weak spring force. Accordingly, the webbing is wound up or pulled out against the weak resistance of the spring of the retractor which pulls the webbing, so that while using the seat belt, the passenger would not have oppressive sensation from the seat belt.

To keep this condition, it is preferable that the retractor normally be left unlocked. However, in case of emergency involving a collision or the like, it is necessary that the webbing be locked to restrain and protect the passenger. For this reason, a vehicle acceleration sensor is built into the retractor for locking the webbing when an increase in acceleration greater than a predetermined rate is detected by the vehicle acceleration sensor.

FIG. 1 shows a conventional vehicle acceleration sensor in the locked state for a webbing (not shown). The vehicle acceleration sensor is provided with a pivotable unit sensor arm 1. The sensor arm 1 comprises a lower sensor arm section 1a and an upper sensor arm section 1b. The lower sensor arm section 1a and the upper sensor arm section 1b are integrally assembled and mounted on a sensor casing 7, so that they can swing around an arm support pin 3 as a unit.

In addition, an inertial body 6 is positioned on a bearing surface 8. The lower sensor arm section 1a contacts the inertial body 6, and the movement of the inertial body 6 can be transmitted to the upper arm section 1b. The inertial body 6 moves in response to the acceleration (in a minus direction in such a case the vehicle is suddenly stopped), so that if an increase in acceleration greater than a predetermined rate occurs, the inertial body 6 moves into the locked state which is detailed in the following paragraph. Accordingly, the unit sensor arm 1 which contacts the inertial body 6 can swing around the arm support pin 3, and when the inertial body 6 reaches the locked state, the unit sensor arm 1 which transmits the movement of the inertial body 6 rises to the position of a ratchet wheel 4, where the unit sensor arm 1 is interlocked with the ratchet wheel 4 to lock the webbing so as not to be pulled any more.

However, there are two problems associated with the vehicle acceleration sensor of FIG. 1.

The first problem is that it takes considerable time to restore the vehicle acceleration sensor and also the webbing to the unlocked state from the locked state.

In a conventional vehicle acceleration sensor, when a change occurs in the acceleration of the vehicle, a swinging motion and/or circular motion occurs in the inertial body. Even when the vehicle body acceleration becomes zero, considerable time elapses until this motion is damped. For example, suppose that the vehicle acceleration sensor shown in FIG. 1 is in the locked state, but the inertial body 6 is in a state wherein the swinging and/or circular motion can continue on the bearing surface 8 of the sensor casing 7. In this state, when the inertial body 6 exhibits a swinging and/or circular motion, even if the vehicle acceleration is in the unlock stage, the inertial body 6 continuously moves as far as the locked state, so that the ratchet wheel 4 and the unit sensor arm 1 remain in the locked state. Accordingly, the webbing will wind up as a result of the movements of the passenger, but cannot be drawn out, so that the passenger would be subjected to an oppressive sensation.

In addition, when the vehicle acceleration sensor enters the locked state as the result of an incline in the vehicle body, it is delayed in returning to the unlocked state. The inertial body must return to the original position with its own weight in order that the vehicle acceleration sensor moved in the locked state because of the incline of the vehicle returns to the unlocked state, so that a steep hill or the like can cause the inertial body to move in the locked direction and go into the locked state unnecessarily, or the sensor arm is prevented from moving to the unlocked state. As a result, the movement of the sensor arm from the locked state to the unlocked state requires extra time.

The second problem concerns when the device enters the locked state from the vibration of the vehicle body.

Conventionally, the system comprising the inertial body and the sensor casing in the vehicle acceleration sensor for the retractor has an inherent oscillation frequency, characteristic to the bearing surface in a cone-shape or concave spherical shape of the sensor casing in which the inertial body is positioned.

In the vehicle when running on bad roads, oscillations at the inherent oscillation frequency of the vehicle in the longitudinal and lateral directions of the vehicle are produced, and kinetic energy is imparted to the inertial body of the vehicle acceleration sensor from the oscillations to cause vibrations in the inertial body.

In the case where the inherent oscillation frequency of the system including the inertial body and the oscillation frequency of the longitudinal and lateral oscillations are in agreement, even when the acceleration of the oscillations of the vehicle is small (for example, 0.1 to 0.2 G) so that it does not reach the acceleration at which locking should occur in an emergency, the phenomenon of resonance imparts a large amplitude to the inertial body which incurs a continuous swing or circular motion and enters the locked state. Accordingly, the retractor becomes locked, the webbing compresses the passenger who receives an oppressive sensation.

In this way, even though the vehicle acceleration is smaller than the locking acceleration, the retractor sometimes remains in the locked state, which is referred to, in this case, as an overlocked state.

Japanese Laid Open Patent No. Sho 56-93253 reveals a webbing lock device for a retractor in which a lock member is positioned between a sensor arm and a ratchet wheel. Specifically, the lock member engages the ratchet wheel of the retractor through the sensor arm. In this way, the movement of a moving ball, that is an inertial body is transmitted to the lock member.

However, when the lock member engages the ratchet wheel, the arm only rides on the moving ball, so that movement of the moving ball is not adequately prevented. Therefore the same problems occur as outlined for the previous example of the prior technology.

SUMMARY OF THE INVENTION

An object of the present invention is to provide, with due consideration to the drawbacks of such conventional devices, an overlock prevention mechanism in which prevents an overlock of the retractor caused by the vibration and slope of the vehicle body, so that the webbing imparts no oppressive sensation to the passenger.

Another object of the present invention is to provide a webbing lock mechanism which can be quickly transferred from the locked state to the unlocked state and from the unlocked state to the locked state.

Another object of the present invention is to provide a webbing lock device which is prevented from causing malfunctions such that it is moved into the locked state e.g. by vibration of the vehicle body.

Another object of the present invention is to provide a vehicle acceleration sensor whereby, when the vehicle acceleration (in a minus direction) is smaller than the lock stage acceleration, the retractor is always kept in the unlocked state.

These objects are achieved in the present invention by the provision of a composite sensor arm assembly in a vehicle acceleration sensor for a retractor comprising at least two arms, specifically, an upper sensor arm which is adapted to be engaged with the ratchet wheel, and a lower sensor arm which is adapted to come into contact with an inertial body, so that when locking occurs, the lower sensor arm presses down on the inertial body to suppress the movement of the inertial body.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
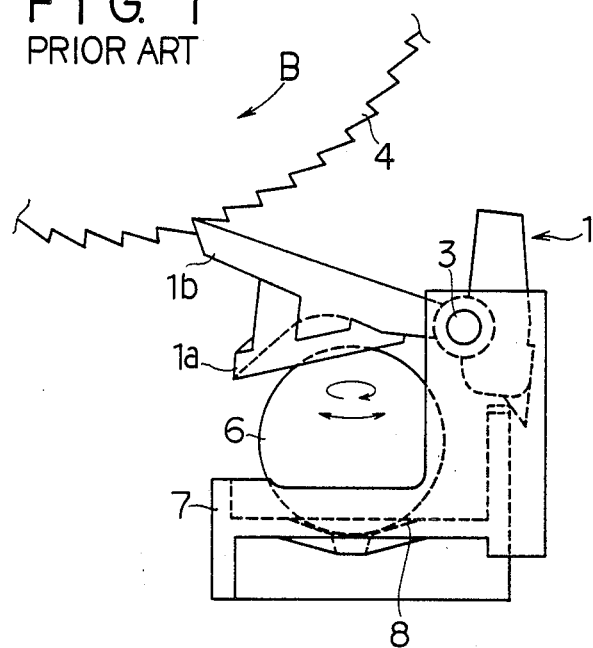
FIG. 1 is a schematic illustration of a conventional vehicle acceleration sensor in the locked state.

In one embodiment of the present invention, an overlock prevention mechanism for a vehicle acceleration sensor used on a retractor for a seat belt device in a vehicle comprises an inertial body which is subjected to a movement in response to the acceleration of the vehicle; a sensor casing on which the inertial body is mounted; a ratchet wheel which locks the retractor; and a composite sensor arm assembly comprising an upper sensor arm which is adapted to be engaged with the ratchet wheel, and a lower sensor arm which is adapted to come into contact with the inertial body to transmit the movement of the inertial body to the upper sensor arm. When the upper sensor arm is engaged with the ratchet wheel in an interlocking relationship, the lower sensor arm is forced toward the inertial body by a force activated from the ratchet wheel and transmitted through the upper sensor arm, so that the inertial body is pressed to the sensor casing against movement.

In another embodiment of the present invention, an overlock prevention mechanism for a vehicle acceleration sensor used on a retractor for a seat belt device in a vehicle comprises an inertial body which is subjected to a movement in response to acceleration of the vehicle; a sensor casing on which the inertial body is mounted; a freely rotatable ratchet wheel; and a composite sensor arm assembly which is mounted on the sensor casing and positioned between the ratchet wheel and the inertial body. The composite sensor arm assembly comprises an upper sensor arm provided on the ratchet wheel side or closer to the ratchet wheel and having first and second ends; and a lower sensor arm provided on the inertial body side or closer to the inertial body and having a first end. The lower sensor arm is mounted at the first end thereof to the sensor casing and freely pivotable around a rotation axis at the first end thereof so as to come into contact with the inertial body to press down against the inertial body. The upper sensor arm is mounted at the first end thereof to the lower sensor arm at a position separated from the first end of the lower sensor arm and freely pivotable around a rotation axis at the first end thereof. And the second end of the lower sensor arm is adapted to be engaged with the ratchet wheel. Accordingly, the lower sensor arm presses against the upper sensor arm in response to the movement of the inertial body, so that, when the movement of the inertial body is greater than a predetermined amount, the second end of the upper sensor arm is engaged with the ratchet wheel. And when the second end of the upper sensor arm is engaged with the ratchet wheel in an interlocking relationship, the ratchet wheel turning in a first direction presses down on the lower sensor arm through the upper sensor arm thereby causing the lower sensor arm to press the inertial body against movement. In addition, the upper arm is mounted to the lower arm at a position on the inertial body side, specifically biased toward the inertial body from a line which is drawn between the second end of the upper sensor arm and the rotation axis of the lower sensor arm.

In another embodiment of the present invention, a lock mechanism comprises a sensor casing which experiences acceleration in movement; an inertial body housed in the sensor casing and subjected to a movement relative to the sensor casing in response to the acceleration of the sensor casing; a freely pivotable ratchet wheel; a composite sensor arm assembly mounted on the sensor casing and positioned between the ratchet wheel and the inertial body. The composite sensor arm assembly comprises an upper sensor arm provided on the ratchet wheel side or closer to the ratchet wheel and having first and second ends, and a lower sensor arm provided on the inertial body side or closer to the inertial body and having a first end. The lower sensor arm is mounted at the first end thereof to the sensor casing such that the lower sensor arm is rotatable around a rotation axis at the first end thereof so as to come into contact with the inertial body in a pressing relationship. The upper sensor arm is connected at the first end thereof to the lower sensor arm at a position separated from the first end of the lower sensor arm and freely pivotable around a rotation axis at the first end thereof. And the second end of the lower sensor arm is adapted to be engaged with the ratchet wheel. Accordingly, the lower sensor arm presses against the upper sensor arm in response to the movement of the inertial body. When the movement of the inertial body is greater than a predetermined amount, the second end of the upper sensor arm is engaged with the ratchet wheel. And when the movement of the inertial body is kept large during the rotation of the ratchet wheel in a first direction, the second end of the upper sensor arm is engaged with the ratchet wheel in an interlocking relationship, so that the ratchet wheel presses against the lower sensor arm through the upper sensor arm, thereby causing the lower sensor arm to press against the inertial body, thus halting the movement of the inertial body. In addition, the second end of the upper sensor arm is separated from the ratchet wheel when the ratchet wheel is rotated in a second direction opposite to the first direction, so that the composite sensor arm assembly comes into contact with the halted inertial body allowing the movement of the inertial body.

Now referring to the drawings, an embodiment of the overlock prevention mechanism according to the present invention is described.

Figure 2:
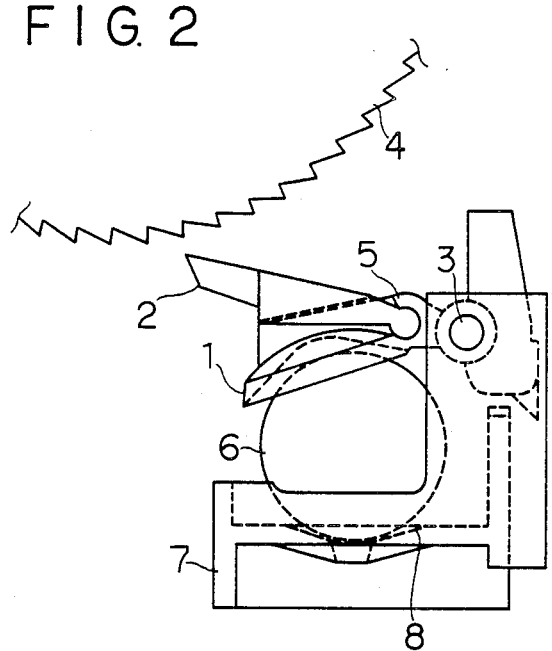
FIG. 2 is a schematic illustration of the vehicle acceleration sensor in the unlocked state in an embodiment of the present invention.

FIG. 2 is a schematic illustration of the vehicle acceleration sensor in the unlocked state in an embodiment of the present invention.

The vehicle acceleration sensor is provided with a pivotable composite sensor arm assembly comprising a lower sensor arm 1 and an upper sensor arm 2. The lower sensor arm 1 and the upper sensor arm 2 are capable of rotating separately. The lower sensor arm 1 is mounted so that it is capable of swinging around an arm support pin 3. The upper sensor arm 2 is mounted so that it is capable of swinging around an arm-linking section 5 of the lower sensor arm 1 at a mid portion relatively close to the arm support pin 3. The balance of the configuration is substantially the same as shown in FIG. 1.

Figure 3:
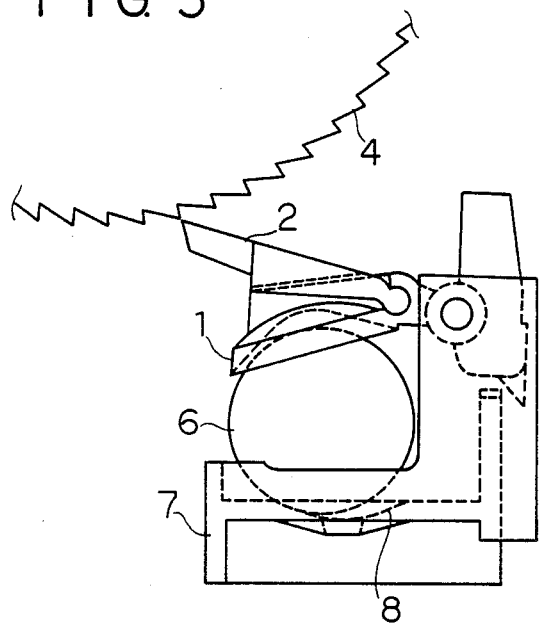
FIG. 3 is a schematic illustration of the same vehicle acceleration sensor in the embodiment of the present invention at the instant of locking.

FIG. 3 shows the vehicle acceleration sensor of the embodiment of the present invention just as it is entering the locked state. Specifically, the vehicle acceleration sensor is in a condition where the vehicle acceleration in a minus direction reaches the lock stage acceleration during an emergency, and the upper sensor arm 2 which is linked to the lower sensor arm 1 is at the point of engaging the ratchet wheel 4 as the result of the motion of an inertial body 6.

Figure 4:
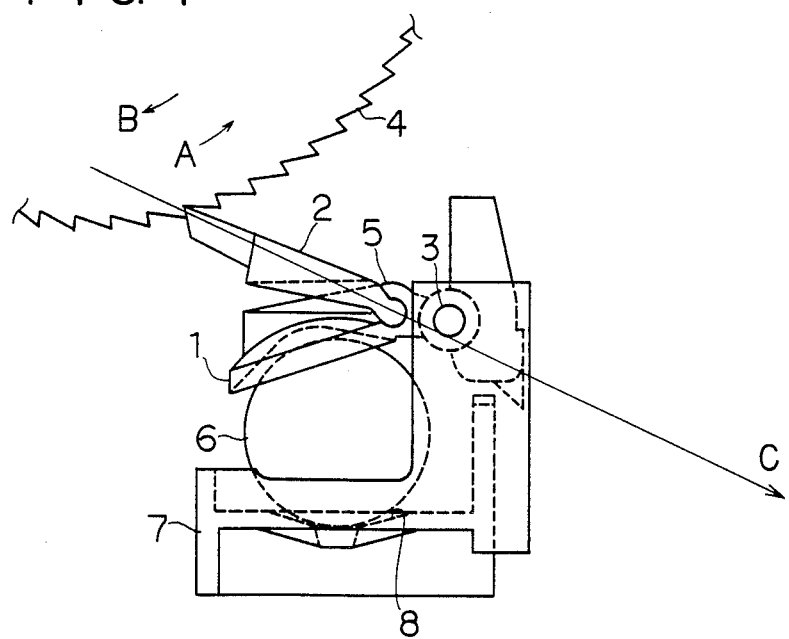
FIG. 4 is a schematic illustration of the same vehicle acceleration sensor in the embodiment of the present invention in the locked state.

FIG. 4 is a schematic illustration showing the vehicle acceleration sensor as it proceeds from the state shown in FIG. 3 further into the fully locked state.

If the webbing is pulled out when the vehicle acceleration sensor is passing from the state shown in FIG. 3 to the state shown in FIG. 4, the ratchet wheel 4 rotates slightly in the counterclockwise direction A and the upper sensor arm 2 is pushed to the right. The line of action of the force from the ratchet wheel 4 which activates the lower sensor arm 1 through the upper sensor arm 2 and the arm-linking section 5 is shown by the arrow C. The line of action C passes at the bottom of the arm support pin 3, so that the lower sensor arm 1 receives a rotary moment in the counterclockwise direction.

By this type of mechanism, the ratchet wheel 4 causes the upper sensor arm 2 to rotate in the clockwise direction around the arm-linking section 5 on the lower sensor arm 1. Simultaneously, the lower sensor arm 1 receives the moment in the counterclockwise direction from the arm linking section 5 around the arm support pin 3. Accordingly, the inertial body 6 is pressed down on the bearing surface 8 of the sensor casing 7 by the lower sensor arm 1, and is positioned in the neutral position without any swinging or circular motion.

In this state when the force to draw out the webbing is reduced, the webbing is wound up on the retractor and the ratchet wheel 4 rotates in the B direction. When this occurs, the upper sensor arm 2 immediately swings downward from its own weight and is disengaged from the ratchet wheel 4 to release the lock.

The following effects are obtained from this configuration.

When the retractor is locked, the inertial body is pressed down by the sensor arm, so that it is possible to prevent the development of the overlock state which is characteristic to a truck system in which a vehicle, in particular, a suspension for supporting the vehicle is comparatively rigid.

In addition, switching from the locked state to the unlocked state even on a steep slope is performed more precisely, so that unnecessary locking of the webbing can be avoided on such a slope.

Accordingly, the discomfort from the oppressive sensation, which the passenger sometimes experiences in the overlock state, does not occur.

By means of the present invention, the inertial body in the locked state is pressed down by the sensor arm, so that the swinging or circular motion of the inertial body does not continue, and overlock is prevented from ocurring.

In addition, even when the vehicle is on a steep slope and the inertial body tends to move in the locking direction, it is possible to position the inertial body forcibly in the unlocked state.

The embodiment described above is not restrictive of the present invention, and various variations would be possible for a person skilled in the art within the scope of the present invention which is clearly defined in the claims.

What is claimed is:

1. An overlock prevention mechanism for a vehicle acceleration sensor used on a retractor for a seat belt device in a vehicle comprising:
    an inertial body which is subjected to a movement in response to said acceleration of said vehicle;
    a sensor casing on which said inertial body is mounted;
    a ratchet wheel which locks said retractor; and
    a composite sensor arm assembly comprising an upper sensor arm which is adapted to be engaged with said ratchet wheel, and a lower sensor arm which is adapted to come into contact with said inertial body to transmit said movement of said inertial body to said upper sensor arm;
    wherein when said upper sensor arm is engaged with said ratchet wheel in an interlocking relationship, said lower sensor arm is forced toward said inertial body by a force activated from said ratchet wheel and transmitted through said upper sensor arm, so that said inertial body is pressed to said sensor casing against movement.

2. An overlock prevention mechanism for a vehicle acceleration sensor used on a retractor for a seat belt device in a vehicle comprising:

an inertial body which is subjected to a movement in response to acceleration of said vehicle;

a sensor casing on which said inertial body is mounted;

a freely rotatable ratchet wheel; and a composite sensor arm assembly which is mounted on said sensor casing and positioned between said ratchet wheel and said inertial body;

said composite sensor arm assembly comprising an upper sensor arm provided closer to said ratchet wheel and having first and second ends, and a lower sensor arm provided closer to said inertial body and having a first end; wherein said lower sensor arm is mounted at said first end thereof to said sensor casing and freely pivotable around a rotation axis at said first end thereof so as to come into contact with said inertial body to press down against said inertial body; said upper sensor arm is mounted at said first end thereof to said lower sensor arm at a position separated from said first end of said lower sensor arm and freely pivotable around a rotation axis at said first end thereof; and said second end of said lower sensor arm is adapted to be engaged with said ratchet wheel;

whereby said lower sensor arm presses against said upper sensor arm in response to said movement of said inertial body, so that, when said movement of said inertial body is greater than a predetermined amount, said second end of said upper sensor arm is engaged with said ratchet wheel; and when said second end of said upper sensor arm is engaged with said ratchet wheel in an interlocking relationship, said ratchet wheel turning in a first direction presses down on said lower sensor arm through said upper sensor arm thereby causing said lower sensor arm to press said inertial body against movement.

3. An overlock prevention mechanism of claim 2, wherein said upper arm is mounted to said lower arm at a position biased toward said inertial body from a line which is drawn between said second end of said upper sensor arm and said rotation axis of said lower sensor arm.

4. A lock mechanism comprising:

a sensor casing which experiences acceleration in movement;

an inertial body housed in said sensor casing and subjected to a movement relative to said sensor casing in response to said acceleration of said sensor casing;

a freely pivotable ratchet wheel;

a composite sensor arm assembly mounted on said sensor casing and positioned between said ratchet wheel and said inertial body;

said composite sensor arm assembly comprising an upper sensor arm provided closer to said ratchet wheel and having first and second ends, and a lower sensor arm provided closer to said inertial body and having a first end; wherein said lower sensor arm is mounted at said first end thereof to said sensor casing such that said lower sensor arm is rotatable around a rotation axis at said first end thereof so as to come into contact with said inertial body in a pressing relationship; said upper sensor arm is connected at said first end thereof to said lower sensor arm at a position separated from said first end of said lower sensor arm and freely pivotable around a rotation axis at said first end thereof; and said second end of said lower sensor arm is adapted to be engaged with said ratchet wheel;

whereby said lower sensor arm presses against said upper sensor arm in response to said movement of said inertial body, and when said movement of said inertial body is greater than a predetermined amount, said second end of said upper sensor arm is engaged with said ratchet wheel; and when said movement of said inertial body is kept large during said rotation of said ratchet wheel in a first direction, said second end of said upper sensor arm is engaged with said ratchet wheel in an interlocking relationship, so that said ratchet wheel presses against said lower sensor arm through said upper sensor arm, thereby causing said lower sensor arm to press against said inertial body, thus halting said movement of said inertial body; and said second end of said upper sensor arm is separated from said ratchet wheel when said ratchet wheel is rotated in a second direction opposite to said first direction, so that said composite sensor arm assembly comes into contact with said halted inertial body allowing said movement of said inertial body.

5. The lock mechanism of claim 4 used on a retractor for webbing in an automobile seat belt device, wherein said inertial device detects said acceleration of said sensor casing.

6. The lock mechanism of claim 5, wherein said ratchet wheel rotates in said first direction when said webbing is pulled out from said retractor, and said ratchet wheel rotates in said second direction when said webbing is rolled up on said retractor.

* * * * *